P. C. SMITH.
LUBRICATING COUPLING.
APPLICATION FILED MAR. 14, 1921.
1,408,836.
Patented Mar. 7, 1922.
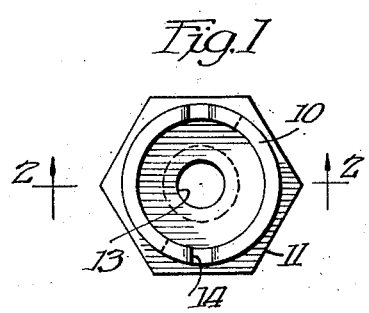
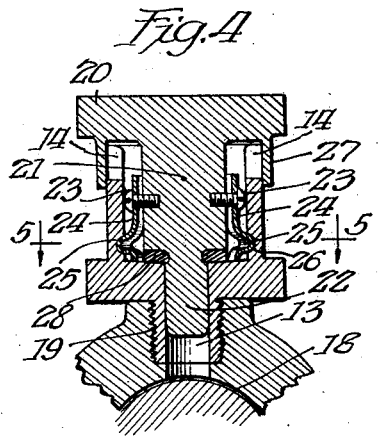
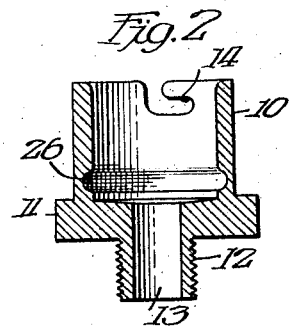
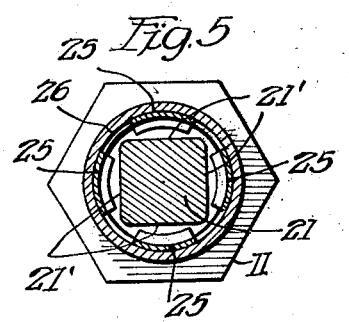
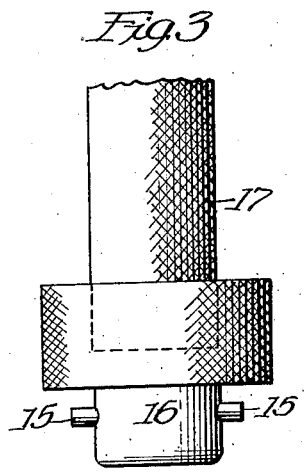
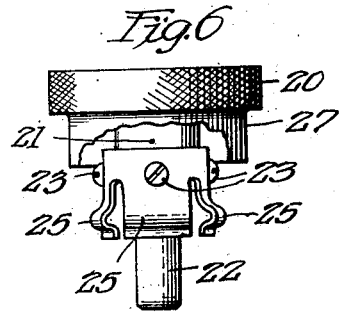
Inventor:
Perry C. Smith,
By Samuel N. Pond,
atty.

UNITED STATES PATENT OFFICE.

PERRY C. SMITH, OF CHICAGO, ILLINOIS.

LUBRICATING COUPLING.

1,408,836.   Specification of Letters Patent.   Patented Mar. 7, 1922.

Application filed March 14, 1921. Serial No. 452,176.

*To all whom it may concern:*

Be it known that I, PERRY C. SMITH, a citizen of the United States, residing at Chicago, in the county of Cook and State of Illinois, have invented certain new and useful Improvements in Lubricating Couplings, of which the following is a specification.

This invention relates to an improved lubrication coupling designed to be applied to a bearing after the fashion of an ordinary grease cup, and to receive a cooperating coupling on the end of a grease gun hose, for supplying grease, when required, to the bearing.

One object of the present invention is to provide a very simple coupling member for application to the bearing which shall present a neat appearance, may be readily applied and removed and shall at all times effectively guard the grease passage against dust, dirt and other foreign matter. Another object is to provide a coupling member equipped with a cap or cover that will be spring-locked in place against accidental dislodgement, and that may be readily withdrawn for the application of the grease gun coupling. A still further object is to provide a coupling member adapted to interlock with the coupling member of the grease gun and a cap or cover therefor which, when applied, will completely cover the locking slots in its side walls and prevent the entrance of foreign matter therethrough.

Other objects and attendant advantages of the invention will be readily understood and appreciated by those skilled in the art as the same becomes better understood by reference to the following detailed description, taken in connection with the accompanying drawing, in which I have illustrated one practical and approved embodiment of the invention, and in which;—

Fig. 1 is a top plan view of my improved lubrication coupling, with the cap or cover thereof removed;

Fig. 2 is a vertical section on the line 2—2 of Fig. 1;

Fig. 3 is an elevation of the outer end of the grease gun hose and the hose coupling swiveled thereon;

Fig. 4 is a vertical section of the lubrication coupling mounted on a bearing and with the cap or cover thereof applied thereto;

Fig. 5 is a section on the line 5—5 of Fig. 4; and

Fig. 6 is an elevation, partly broken out, of the cap or cover member.

Referring to the drawings, 10 designates a cylindrical cup-shaped member, the base 11 of which is formed as a hexagonal nut. Depending from the base 11 is a threaded stem or shank 12, and through the base 11 and stem 12 is an axial grease duct 13 that communicates freely with the interior of the body member 10.

At diametrically opposite points in the cylindrical wall of the body member 10 are a pair of bayonet slots 14. These slots are designed to interlock with a pair of lateral pins or studs 15 (Fig. 3) formed on a cooperating coupling member 16 that is swiveled on the outer end of a grease gun hose 17. When the coupling member 16 is inserted in the cup-shaped member 10 with the pins 15 entering the slots 14, and given a partial turn, the two members are securely locked together against separation under the pressure of the greese forced through the axial bore 13 to the bearing indicated at 18 in Fig. 4.

The threaded stem 12 is mounted in a tapped socket 19 of the bearing as shown in Fig. 4, and is designed to be carried by the latter, after the fashion of an ordinary grease cup. To protect the bearing against the admission of dust, dirt and other foreign matter, I employ a closure member which comprises a circular milled head 20, a central body 21, and a reduced stem 22 of a size to snugly fit the bore 13 of the body member. To secure this closure in place, when applied, I preferably flatten the sides of the body member 21, as shown at 21' in Fig. 5, and to these sides I attach, by screws 23, a corresponding number of thin leaf springs 24, the lower free ends of which are curved outwardly and then downwardly to form segmental ribs 25 which, when the cap is inserted in place, snap into an internal annular groove or channel 26 (Fig. 2) formed near the bottom of the cup-shaped body member 10. These springs securely lock the cap against accidental displacement, but yield under a sufficiently strong pull on the cap and permit the latter to be withdrawn when necessary.

Depending from the lower side of the head 20 of the cap is an annular skirt 27 that snugly fits the outer surface of the member 10 and is of sufficient length to completely cover the bayonet slots 14.

Between the bottom of the member 21 of the cap and the base 11 of the body of the coupling I preferably insert an annular fiber washer 28 which further guards the grease passage or duct against the admission of dust and dirt.

It is believed that the structural features and the manner of use of my improved lubrication coupling will be readily understood from the foregoing description and the accompanying illustration. Manifestly minor variations in the structural details may be resorted to without departing from the spirit of the invention or changing its substantial character. Hence I reserve all such variations as fall within the spirit and purview of the appended claims.

I claim:

1. A lubrication coupling comprising a cup-shaped body having its base shaped to provide a wrench-hold, and a hollow threaded stem for mounting on a bearing, said cup-shaped body being formed with an internal annular groove, a closure member having a head overlying said cup-shaped body and a central body portion entering the latter and closing the upper end of the bore of said stem and a plurality of springs secured to the sides of said body portion, said springs having segmental ribs adapted to snap into said annular groove when said closure member is applied.

2. A lubrication coupling comprising a cup-shaped body having its base shaped to provide a wrench-hold, and a hollow threaded stem for mounting on a bearing and providing a grease duct, said cup-shaped body being formed with an internal annular groove, a closure member having a head overlying said body member, a central body portion entering the latter, and a reduced extension plug slidably fitting said grease duct, and a plurality of springs secured to the sides of said body portion, said springs having segmental ribs adapted to snap into said annular groove when said closure member is applied.

3. A lubrication coupling comprising a cup-shaped body formed with locking slots in its sides adapted to cooperate with locking pins on a grease gun coupling and a hollow threaded stem for mounting on a bearing, and a closure member formed with a head overlying said cup-shaped body, a central body portion entering the latter and carrying means for yieldably locking the same to said cup-shaped body, and a sleeve or skirt surrounding the latter and forming a closure for said locking slots.

PERRY C. SMITH.